United States Patent [19]

Wrobel

[11] Patent Number: 5,704,336
[45] Date of Patent: Jan. 6, 1998

[54] FUEL SYSTEM

[75] Inventor: Jeremy Stephen Wrobel, Middlesex, England

[73] Assignee: Lucas Industries, public limited company, West Midlands, England

[21] Appl. No.: 612,259

[22] Filed: Mar. 7, 1996

[30] Foreign Application Priority Data

Mar. 8, 1995 [GB] United Kingdom ............... 9504625

[51] Int. Cl.[6] ........................................... F02M 37/04
[52] U.S. Cl. .................... 123/494; 123/436; 123/501; 73/506
[58] Field of Search ........................ 123/494, 501, 123/500, 419, 436; 73/119 A, 506

[56] References Cited

U.S. PATENT DOCUMENTS

| | | | |
|---|---|---|---|
| 4,653,454 | 3/1987 | Konishi | 123/494 |
| 5,070,846 | 12/1991 | Dudek | 123/494 |
| 5,090,384 | 2/1992 | Ahlborn | 123/436 |
| 5,111,405 | 5/1992 | Maeda | 123/436 |
| 5,237,504 | 8/1993 | Holmes | 123/436 |
| 5,325,833 | 7/1994 | Fukui | 123/436 |
| 5,377,537 | 1/1995 | James . | |
| 5,428,991 | 7/1995 | Klenk et al. . | |
| 5,452,604 | 9/1995 | Namiki | 123/436 |
| 5,559,705 | 9/1996 | McClish | 123/436 |

FOREIGN PATENT DOCUMENTS

| | | |
|---|---|---|
| 3339231A1 | 5/1984 | Germany . |
| 4117656A1 | 12/1991 | Germany . |
| 4133679A1 | 4/1993 | Germany . |
| 2245027 | 12/1991 | United Kingdom . |

*Primary Examiner*—Carl S. Miller
*Attorney, Agent, or Firm*—Trexler, Bushnell, Giangiorgi & Blackstone, Ltd.

[57] ABSTRACT

A fuel system for an internal combustion engine (10) includes a controller (14) which controls the operation of an engine fuel pump (13). Signals are supplied to the controller by a transducer (16) which is responsive to the passage of teeth formed on the periphery of a wheel (12) which is mounted on the engine crankshaft. In order to generate an engine speed signal it is necessary to know the tooth spacing errors and these are determined by recording two time pulse sequences of signals from the transducer at different engine speeds and loads and then processing those signals to firstly determine the periodic component of the signals due to the fluctuation of engine speed which occurs due to the individual power strokes of the engine.

12 Claims, 1 Drawing Sheet

FUEL SYSTEM

BACKGROUND OF THE INVENTION

This invention relates to a fuel system for an internal combustion engine, the system comprising a fuel pump, a controller for controlling the operation of the fuel pump so that fuel is delivered to the engine at the required time and in the desired quantity, means for supplying a demand signal to the controller, a wheel driven by the engine, a plurality of indicia on the wheel positioned about the axis of rotation thereof, transducer means responsive to the passage of said indicia as the wheel rotates and means responsive to the signals generated by said transducer means for measuring the time intervals between the passage of the indicia past said transducer means.

SUMMARY OF THE INVENTION

In an example, the indicia takes the form of teeth which are formed in the periphery of the wheel and the transducer means is a variable reluctance probe. However, the indicia may have other forms such for example as a plurality of marks on the surface of the wheel and the transducer means in this case would comprise an optical sensor. The teeth or other indicia are equi-angularly spaced about the axis of rotation of the wheel although in some instances one or two teeth may be omitted to provide an identification mark. Due to manufacturing difficulties the spacings may not be exactly equal and this means that for a given speed of rotation of the wheel, the time intervals between the passage of the teeth past the transducer means will not be equal and therefore the speed signal which is computed each time a tooth passes the transducer means will not be constant even though the rotational speed is constant.

In practice the speed of a reciprocating piston internal combustion engine fluctuates as each engine cylinder partakes of its power stroke and this represents an additional problem when determining the engine speed.

The object of the invention is to provide such a system in a simple and convenient form.

BRIEF DESCRIPTION OF THE DRAWINGS

An example of a fuel system in accordance with the invention will now be described with reference to the accompanying drawings and diagrams in which.

DETAILED DESCRIPTION OF THE INVENTION

Figure 1:
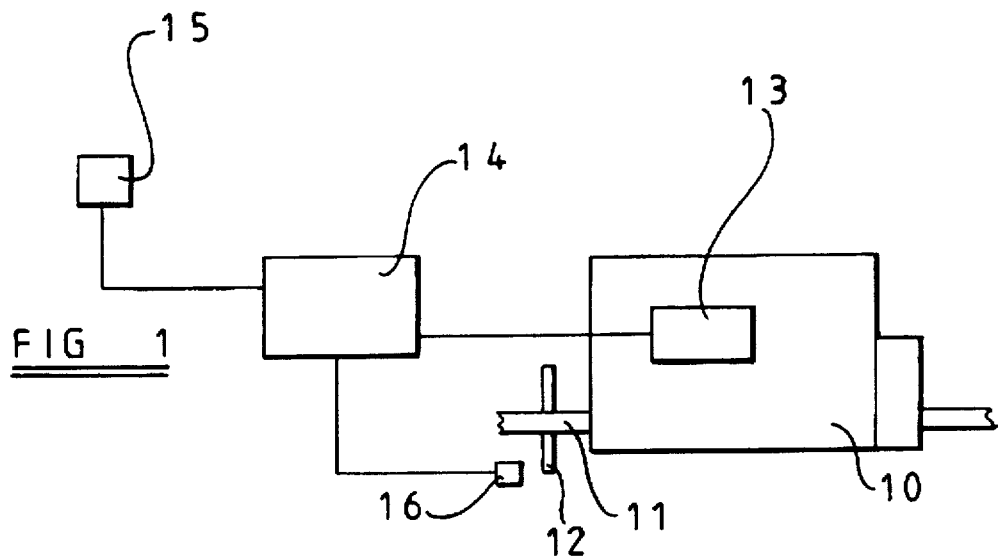
FIG. 1 is a diagrammatic layout of the fuel system as applied to a compression ignition engine.

With reference to FIG. 1 there is indicated at 10 a vehicle compression ignition engine having a crankshaft 11 upon which is mounted a wheel or disc 12 the periphery of which in the example, is provided with sixty substantially equi-angularly spaced teeth.

Fuel is supplied to the engine by means of a fuel pump 13 which may for example, be a rotary distributor pump having an electrically operated control facility or the fuel pump can be replaced by a unit injector system in which the unit injectors supply fuel to the combustion chambers of the engine respectively, each unit injector incorporating an electrically controlled spill valve. An alternative system is one in which fuel is stored under pressure in an accumulator and distributed to the injection nozzles in turn under the control of an electrically controlled valve.

For controlling the operation of the pump 13, the unit injectors or the aforesaid valve, a controller 14 is provided and this supplies signals to determine the quantity of fuel to be supplied to the engine and the instant of fuel delivery. The controller 14 acts as a governor to control the engine speed and for this purpose it is supplied with a driver demand signal by a transducer 15 associated with the throttle pedal of the vehicle. In addition, the controller is supplied with signals by a variable reluctance type transducer 16 which is responsive to the passage of the teeth on the wheel 12 as the engine crankshaft rotates. The controller utilises the signals provided by the transducer 16 to determine the engine speed and may be supplied with other signals indicative of other engine operating parameters for example, air pressure and engine temperature. On the basis of the signals supplied to it the controller 14 determines the quantity of and the timing of fuel delivery to the engine.

In order that the controller 14 can respond quickly and correctly to changes in the operating parameters of the engine and in particular the engine speed, it is necessary to carry out a speed calculation each time a tooth passes the transducer. In the example the wheel has sixty teeth and this means that each tooth is 3° wide and is followed by a gap of the same dimension thereby providing a tooth cycle of 6°. In practice because of errors in the manufacture of the wheel each tooth cycle may not have the same length and before the engine speed can be calculated it is necessary to know the error and the length of the tooth cycle.

The only information which is available to the controller 14 are the time intervals between successive pulses produced by the transducer 16 but apart from the errors arising in the manufacture of the wheel the actual time intervals are also influenced by the engine speed which as previously mentioned, varies even when the engine is operating at a nominal constant speed. In order therefore to determine the actual tooth spacing errors it is necessary to take into account the engine speed variation. In practice, the actual engine speed variation which takes place during for example one rotation of the wheel, depends upon the engine speed and the load on the engine. There will therefore be minor differences and this is important so far as the way in which the tooth spacing is corrected.

Two time pulse sequences are first recorded for one revolution of the wheel 12, with the engine operating at different engine speed and load conditions and the mean values for the two sequences are calculated. One of the sequences is identified throughout the remaining portion of the text as the REFERENCE sequence and the other as the ESTIMATION sequence. The ESTIMATION sequence is then scaled to the REFERENCE sequence by multiplying it by the appropriate ratio of the mean values of the two sequences to produce the SCALED ESTIMATION sequence. The differences between the SCALED ESTIMATION sequence and the REFERENCE sequence are then determined and the resulting time sequence is called the PERIODIC sequence. This sequence is the difference between the periodic components of the SCALED ESTIMATION sequence and the REFERENCE sequence as the tooth spacing errors are eliminated in the subtraction process.

The next step is to calculate the REFERENCE PERIODIC COMPONENT SEQUENCE—i.e. the components of the REFERENCE SEQUENCE purely due to the periodic speed fluctuations. This may be calculated using either of two methods.

The first method is to calculate the amplitudes of the REFERENCE SEQUENCE and the PERIODIC SEQUENCE by taking the average of their periodic peak values and subtracting their mean values. Their amplitudes are called AMPREF and AMPDIF respectively. The assumption is made that the REFERENCE PERIODIC COMPONENT SEQUENCE is proportional to the PERIODIC SEQUENCE and its amplitude is the same as that of the REFERENCE SEQUENCE i.e. AMPREF. The PERIODIC SEQUENCE is scaled to have the amplitude AMPREF by multiplying it by the amplitude ratio AMPREF/AMPDIF.

The second method of calculating the REFERENCE PERIODIC COMPONENT SEQUENCE uses standard "least squares" minimisation methods to scale the PERIODIC SEQUENCE to obtain the "best fit" with the REFERENCE SEQUENCE.

Figure 2:
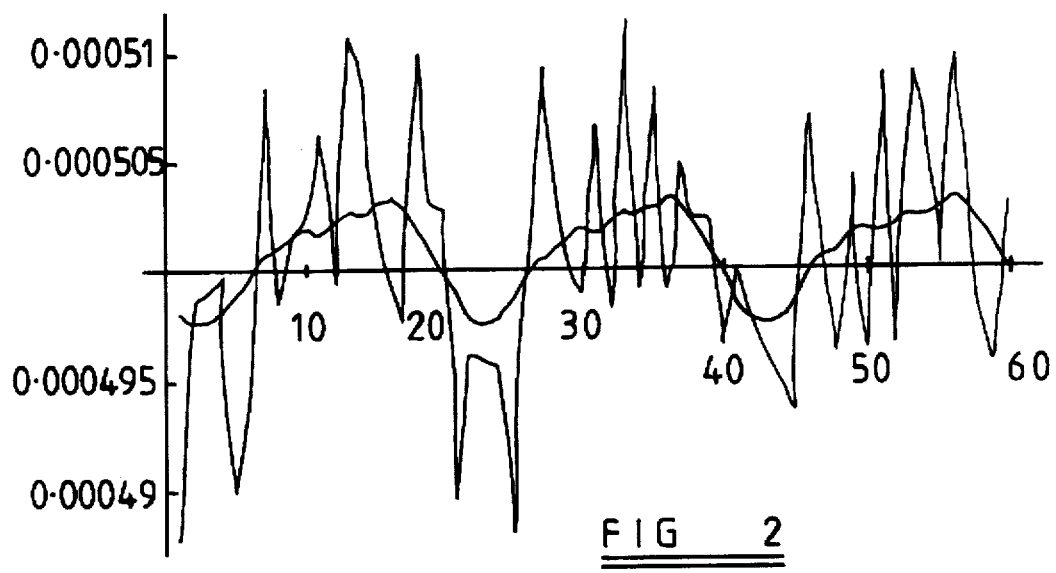
FIG. 2 shows the variation in the time intervals about a mean value during one rotation of the wheel and also the periodic component due to engine speed fluctuation.

FIG. 2 is a representation of the REFERENCE sequence and the PERIODIC COMPONENT SEQUENCE, the REFERENCE sequence demonstrating the tooth spacing errors and speed variation.

Next, the REFERENCE TOOTH-SPACING ERROR COMPONENT SEQUENCE (the sequence of components of the REFERENCE SEQUENCE purely due to the tooth-spacing errors) is calculated by subtracting the REFERENCE PERIODIC COMPONENT SEQUENCE from the PERIODIC SEQUENCE.

Finally, since the tooth-spacing angle is proportional to its associated time interval, an element in the REFERENCE TOOTH-SPACING ERROR COMPONENT SEQUENCE, (assuming constant speed over this time interval) and, assuming that the REFERENCE PERIODIC COMPONENT SEQUENCE represents the times for ideally spaced teeth to pass the fixed transducer—the TOOTH SPACING ERRORS can be calculated by multiplying the REFERENCE TOOTH ERROR COMPONENT SEQUENCE by the ideal angle 6° in the case of a wheel having 60 teeth, and dividing by the REFERENCE PERIODIC COMPONENT SEQUENCE. Once the tooth spacing errors have been determined then in conjunction with the measured time intervals, the engine speed can be determined.

When each of the two time pulse sequences is recorded it is assumed that the nominal engine speed is constant. In practice however the engine may be accelerating or decelerating and therefore at the intended time of recording each time sequence it is necessary to ascertain whether the nominal engine speed is changing.

For a periodic function the sum of all the sample values taken at regular sampling points, over one period of that function will be the same irrespective of which sampling point in the cycle the first sample value is taken. Applying this to the engine situation, the sampling points may extend over one revolution of the wheel 12 embodying a number of periods of cyclic variation depending on the number of engine cylinders and the working cycle of the engine and if the aforesaid sum value varies from that obtained when starting from another for example the next, sampling point, this is indicative of engine acceleration or deceleration. Alternatively, the sampling points, at which the function values to be summed are obtained, may extend over one period of cyclic variation (20 teeth in the case of a 6 cylinder four stroke engine with a 60 tooth wheel). Detection of the variation of the aforesaid sum value can lead to postponement of the recording of the pulse sequence and therefor the calculation of the tooth spacing errors.

It will be appreciated that the determination of whether the engine is running at constant speed has to be carried out prior to each of the recording steps. If it is determined that the engine is accelerating or decelerating a preliminary step can be carried out to compensate for the acceleration or deceleration.

This preliminary step comprises obtaining the moving period mean of the transducer time data by first summing the values of successive sampling points over 1 period (20 teeth) and then dividing by the number of teeth in the period. This process is repeated after shifting the succession of sampling points by one point. This is repeated for all the teeth of the wheel. The values of the moving period mean signal [PMS] are associated with a mid tooth of wherever the summation period is located. The mean value of this signal is then determined and is assumed to be the constant value which would have been obtained had there been no engine acceleration or deceleration. This mean value is and these deviations are then subtracted from the original transducer signal to compensate for engine acceleration or deceleration. It may be necessary to carry out the preliminary step at the two engine operating conditions. The process of estimating the tooth spacing errors can be carried out at any convenient time during operation of the engine and may be repeated at predetermined intervals during the life of the engine.

What is claimed is:

1. A fuel system for an internal combustion engine comprising a fuel pump, a controller for controlling the operation of the fuel pump so that fuel is delivered to the engine at a required time and in a desired quantity, means for supplying a demand signal to the controller, a wheel driven by the engine, a plurality of indicia on the wheel and positioned about an axis of rotation of the wheel, transducer means responsive to the passage of said indicia as the wheel rotates, means responsive to pulse signals generated by said transducer means for measuring time intervals between the passage of the indicia past the transducer means, wherein said measuring means comprises means for recording two time pulse sequences of signals from the transducer means at different engine speed and load operating conditions, means for determining actual indicia spacing errors from said two time pulse sequences of signals and means for calculating the engine speed using the actual indicia spacing errors and the measured time intervals between the pulses produced by said transducer means.

2. A fuel system according to claim 1, wherein the means for determining the actual indicia spacing error comprises means for determining a PERIODIC sequence, wherein said PERIODIC sequence is the difference between the periodic components of one of said time pulse sequences and the periodic components of a scaled version of the other time pulse sequence.

3. A fuel system according to claim 1, further comprising means for detecting if the engine is running at a nominal constant speed prior to recording each of said time pulse sequences of signals, said detecting means including means for summing sample values obtained at regular sampling points over at least one period of the periodic component of the engine speed fluctuation, and means for comparing the sum with a similar sum obtained by starting at another sampling point to determine whether or not the nominal speed of the engine is constant.

4. A fuel system according to claim 3, wherein said another sampling point is the next sampling point.

5. A fuel system according to claim 3, further comprising means for adjusting the values of said signals produced by said transducer means prior to recording said time pulse sequence signals if said nominal speed of the engine is not constant.

6. A fuel system according to claim 3, further comprising means for summing said sample values at sampling points extending over one revolution of the wheel.

7. A method of calculating the speed of an internal combustion engine within a fuel system, said method comprising:

delivering fuel to the engine at a required time and in a desired quantity;

providing a wheel driven by the engine about an axis of rotation, wherein said wheel has a plurality of indicia about the axis of rotation;

generating pulse signals in response to passage of said indicia as the wheel rotates;

measuring time intervals between the passage of the indicia;

recording two time pulse sequences of signals at different engine speed and load operating conditions;

determining actual indicia spacing errors from said two time pulse sequences of signals; and using the actual indicia spacing errors and the time pulse sequences to determine engine speed.

8. The method according to claim 7, further comprising determining a PERIODIC sequence to determine actual indicia spacing errors, wherein said PERIODIC sequence is the difference between the periodic components of one of said time pulse sequences and the periodic components of a scaled version of the other time pulse sequence.

9. The method according to claim 7, further comprising:

detecting if the engine is running at a nominal constant speed prior to recording each of said time pulse sequences of signals;

summing sample values obtained at regular sampling points over at least one period of the periodic component of the engine speed fluctuation; and comparing the sample value with a similar sum obtained by starting at another sampling point to determine whether or not the nominal speed of the engine is constant.

10. The method according to claim 9, wherein said another sampling point is the next sampling point.

11. The method according to claim 9, further comprising adjusting the values of said signals prior to recording said time pulse sequence signals if said nominal speed of the engine is not constant.

12. The method according to claim 9, further comprising summing said sample values at sampling points extending over one revolution of the wheel.

* * * * *